United States Patent [19]

Hatchett et al.

[11] Patent Number: 5,422,767
[45] Date of Patent: Jun. 6, 1995

[54] VIBRATION DAMPER FOR A MULTIPLE DISK DRIVE UNIT

[75] Inventors: Michael R. Hatchett; John S. Heath; Hubert C. Lee; Eun K. Row; Roger D. Spencer; Michael L. Workman, all of San Jose, Calif.

[73] Assignee: International Business Machines Corporation, Armonk, N.Y.

[21] Appl. No.: 243,722

[22] Filed: May 17, 1994

Related U.S. Application Data

[60] Division of Ser. No. 179,884, Jan. 10, 1994, abandoned, which is a continuation of Ser. No. 850,321, Mar. 10, 1992, abandoned.

[51] Int. Cl.$^6$ .............................................. G11B 17/02
[52] U.S. Cl. .................................................. 360/98.01
[58] Field of Search ............... 360/97.03, 98.01, 97.02, 360/97.04, 97.01; 361/395, 685

[56] References Cited

U.S. PATENT DOCUMENTS

| | | | |
|---|---|---|---|
| 4,367,502 | 1/1983 | Iftikar et al. | 360/97.03 |
| 4,908,715 | 3/1990 | Krum et al. | 360/97.02 |
| 4,912,580 | 3/1990 | Hanson | 360/98.01 |
| 4,979,062 | 12/1990 | Stefansky et al. | 360/97.02 |
| 5,025,336 | 6/1991 | Morehouse et al. | 360/97.02 |
| 5,041,931 | 8/1991 | Uno et al. | 360/97.03 |
| 5,173,819 | 12/1992 | Takahashi et al. | 360/97.03 |
| 5,214,567 | 5/1993 | Feightner et al. | 361/393 |

FOREIGN PATENT DOCUMENTS

| | | |
|---|---|---|
| 0464550A2 | 1/1992 | European Pat. Off. . |
| 0204299 | 12/1986 | United Kingdom . |
| 2190531A | 11/1987 | United Kingdom . |
| 9209077 | 5/1992 | WIPO . |

OTHER PUBLICATIONS

"Removable Tray Assembly", IBM Technical Disclosure Bulletin, vol. 33, No. 12, May 1991, pp. 178-183.

*Primary Examiner*—Robert S. Tupper
*Attorney, Agent, or Firm*—Leslie G. Murray

[57] ABSTRACT

A multiple disk drive system having two disk-head assemblies (HDA) internally mounted on a rigid frame and accessible via a common industry-standard interface connector is provided. Each HDA is enclosed in a separate housing which is mounted on the disk drive system frame. A vibration damper mounted on the disk drive system frame physically contacts each HDA housing providing a spring force which minimizes the effects of shock and vibration on the operation of the HDAs. The vibration damper is coated with a low-wear, electrically insulating material to provide electrical isolation between the vibration damper and the HDAs housings. The coating material is chosen to also provide a desired coefficient of friction between the vibration damper and the HDA housings. A single electronic controller board is shared by both HDAs and is mounted on the bottom side of the frame underlying the HDAs. The controller board may implement SCSI or IPI interfaces in either differential or single-ended versions. The assembly is fully enclosed with metal top and bottom covers to provide separate enclosures for the HDAs, controller board cooling and EMC and RFI protection.

13 Claims, 6 Drawing Sheets

VIBRATION DAMPER FOR A MULTIPLE DISK DRIVE UNIT

This is a divisional application of application Ser. No. 08/179,884 filed on Jan. 10, 1994, now abandoned, which is a continuation of application Ser. No. 07/850,321 filed on Mar. 10, 1992, now abandoned.

BACKGROUND OF THE INVENTION

The present invention relates generally to multiple digital data storage device systems and, more particularly, to at least two high capacity disk drive data storage devices having a specified physical size mounted in a larger standardized form factor package forming a single unit.

One of the principle components of a computer system is a place to store data. Typically computer systems employ a number of storage means to store data for use by a computer system. For example, a computer system can store data in a peripheral storage device referred to as a disk drive or direct access storage device (DASD).

A disk drive or DASD includes one or more disks which appear similar to records utilized with a record player or compact disks (CD) which are utilized with a CD player. The disks are stacked on a spindle for rotary motion in parallel planes, much like records. In a disk drive, however, the disks are mounted to the spindle and spaced apart so that the separate disks do not touch each other.

Such data storage devices employing rotating magnetic or optical media disks are well-known for high capacity, low cost storage of data. Such disks typically have a multiplicity of concentric data track locations formed on one or both surfaces, each capable of storing useful information. The information stored in each track is accessed by a transducer head which is moved among the tracks during track seeking operations and which is maintained in alignment with the track during read only and/or read/write track following operations of the device. Typically one or more transducer heads are provided for each data storage surface. The electromechanical assembly for rotation of the disk relative to the head and for moving the head radially relative to the disk surface for track accessing purposes is referred to as the head and disk assembly (HDA). A control mechanism is provided in order to maintain the head within the boundaries of each data track, and may take the form of detents provided by a stepping motor, or by a continuously positionable actuator operating within a closed loop servo, or a time-sampled servo. Additionally, an interface device is required for connection of the HDA to a controller and for communication between the disk drive and the computer system. Typically, a standardized interface is utilized, for example, the Small Computer Synchronous Interface (SCSI).

Today's technology relating to data storage is marked by continuing trends towards standardization and towards increased storage capacity, reduced data storage device weight and size, and reduced power consumption. Standardization in size, referred to as form factor, and in interface compatibility is being pursued by manufacturers of both desktop systems such as personal computer (PC) and workstation systems and larger computing systems. Thus, disk drives having differing capabilities and capacities provided in standard form factors and plug-in configurations by several different manufacturers may be used interchangeably in different PC's, for example, in standardized plug-in slots provided by the PC manufacturers.

Increasing system storage capacity while reducing disk drive size requires careful balancing of the reduction of the area of the storage medium, i.e., the area of the disk surface, against the corresponding reduction in storage capacity. Typically, the tradeoff is to increase the number of disks per spindle and/or increase the number of disk drives. On a large scale, large numbers of relatively small disk drives are mounted in drawers to provide high storage capacity while taking advantage of common power supplies and cooling facilities, for example, to achieve an overall reduction in power requirements. However, for a PC, for example, a user is limited to adding individual disk drives in the standard form factor slots provided by the PC manufacturer or by adding relatively expensive stand-alone units.

SUMMARY OF THE INVENTION

It is therefore a principal object of the present invention to provide a disk drive assembly in an industry-standard form factor which includes at least two HDAs.

A further object of the present invention is to provide a disk drive assembly in a five and one-quarter (5¼) inch disk drive form factor which includes two three and one-half (3½) inch form factor HDAs mounted on a common frame.

A still further object of the present invention is to provide a disk drive assembly including at least two HDAs and further including a single controller board.

Another object of the present invention is to provide a disk drive assembly including at least two HDAs which are separately addressable via a common interface connector.

Another object of the present invention is to provide a disk drive assembly including at least two HDAs packaged in an industry-standard form factor which is interchangeable with disk drives of the same form factor in a computer system in slots and racks of the same form factor as provided by the computer system manufacturers.

These and other objects of the present invention are accomplished by a multiple disk drive assembly comprising a mounting frame or base having a length approximately equal to the length of a selected disk drive form factor and a width approximately equal to the width of the selected disk drive form factor and having two HDAs mounted on a top side thereof, each of the HDAs having a length approximately equal to the width of the selected disk drive form factor and a width approximately equal to one-half of the length of tile selected disk drive form factor. The multiple disk drive assembly further includes a single, common controller board mounted on the bottom side of the base underlying the two HDAs and having common power and interface connectors mounted at a rear edge of the controller board. A common jumper or option block also mounted at the rear edge of the controller board provides for setting separate addresses for each of the HDAs. Top and bottom covers attached to the top and bottom sides of the base, respectively, form upper and lower enclosures enclosing the HDAs and the controller board and providing a disk drive assembly unit having overall outside dimensions approximately equal to the selected disk drive form factor.

The multiple disk drive assembly of the present invention provides a 5¼ inch disk drive form factor assembly having two 3½ inch disk drive form factor HDAs internally mounted on a rigid frame and accessible via a common industry-standard interface. Both the interface and power connectors and the frame mounting hole patterns are industry standard to provide interchangeability with 5¼ form factor disk drives provided by manufacturers for use in computer systems, such as desktop personal computers, for example. A single electronic controller board is shared by the two HDAs to provide all controller functions and power distribution for the HDAs as well as data transfer to and from the data channel for each HDA. The controller board may be implemented with either SCSI or IPI interfaces in single-ended or differential versions. Top and bottom covers provide the assembly with upper and lower enclosures with sufficient clearance around the HDAs and controller board, respectively, to provide efficient cooling of the components utilizing the cooling provided by the host computer system. A spring vibration damper device is utilized to minimize both external and internal vibration and shock effects to the HDAs. The assembly is fully enclosed with metal covers to provide EMC and RFI protection.

The present invention provides a two-drive array in a single assembly within the constraints of a 5¼ inch industry-standard form factor having common electronics and accessible via a common interface connector. The performance of the array may be optimized for various configurations without forcing a user of the assembly to rewrite or amend their computer operating system software or providing special controllers or interfaces. For example, the two-drive assembly provides two independently addressable disk drives which may be utilized as two separate data storage files or in which one drive may be reserved as a "hot" spare while the other drive is used for data storage. Alternatively, the two-drive array may be configured to provide a "single" drive with the media rate effectively doubled or as one drive with multiple copies of data (mirrored data).

The two-drive assembly of the present invention provides as great or greater storage capacity than a like sized 5¼ inch disk drive while consuming less power. Additionally, since the spindle drive motor for a 3½ inch disk drive is significantly smaller that the spindle motor for a 5¼ inch disk drive and startup can be staggered, less startup current is required.

BRIEF DESCRIPTION OF THE DRAWINGS

The foregoing and other objects, features and advantages of the present invention will be apparent from the following detailed description of the preferred embodiments of the invention, reference being made to the accompanying drawings, in which like reference numerals indicate like parts and in which.

DETAILED DESCRIPTION OF THE PREFERRED EMBODIMENTS

Figure 1:
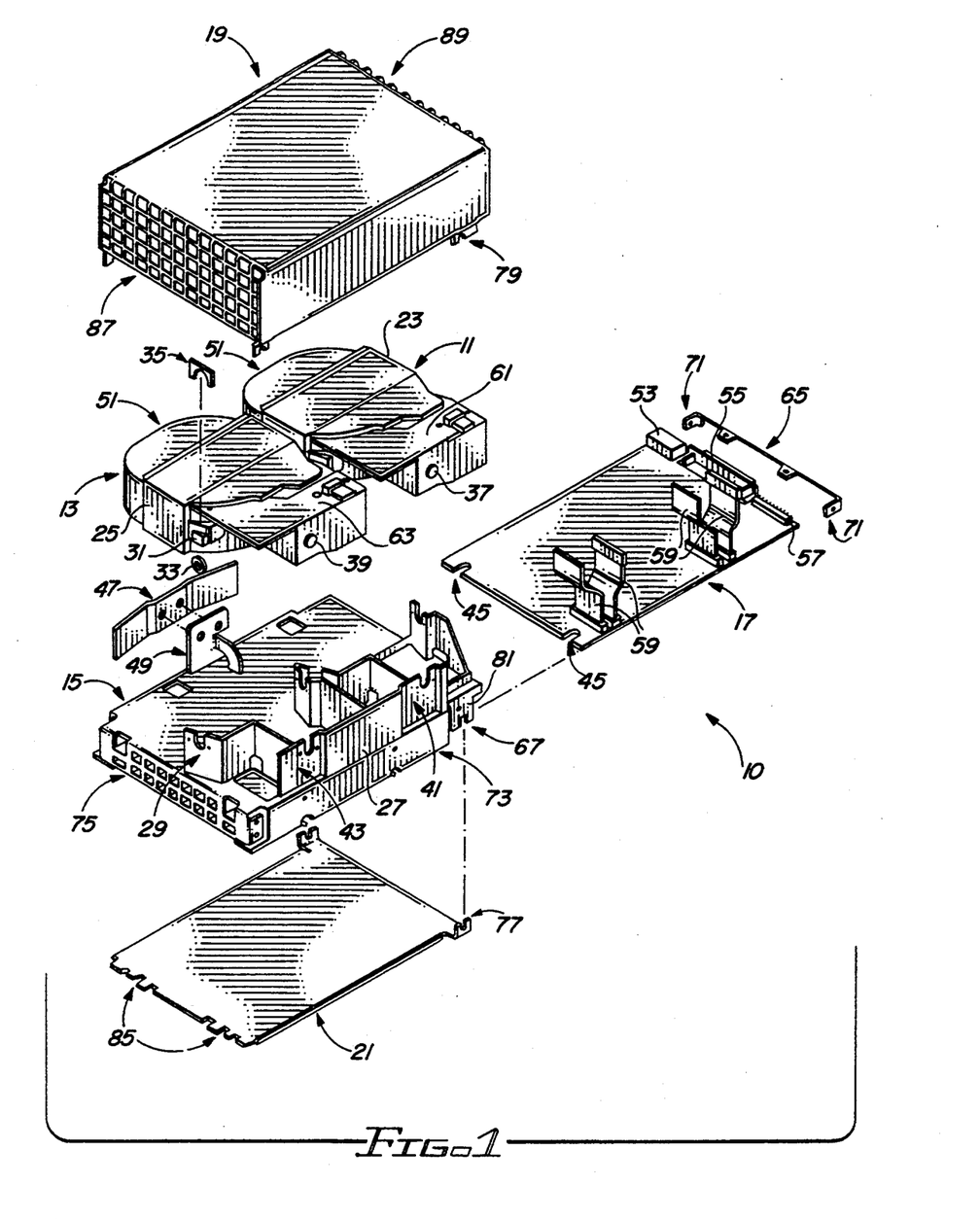
FIG. 1 is an exploded view in perspective of a multiple disk drive system implemented in an industry-standard form factor according to the principles of the present invention.
Figure 2:
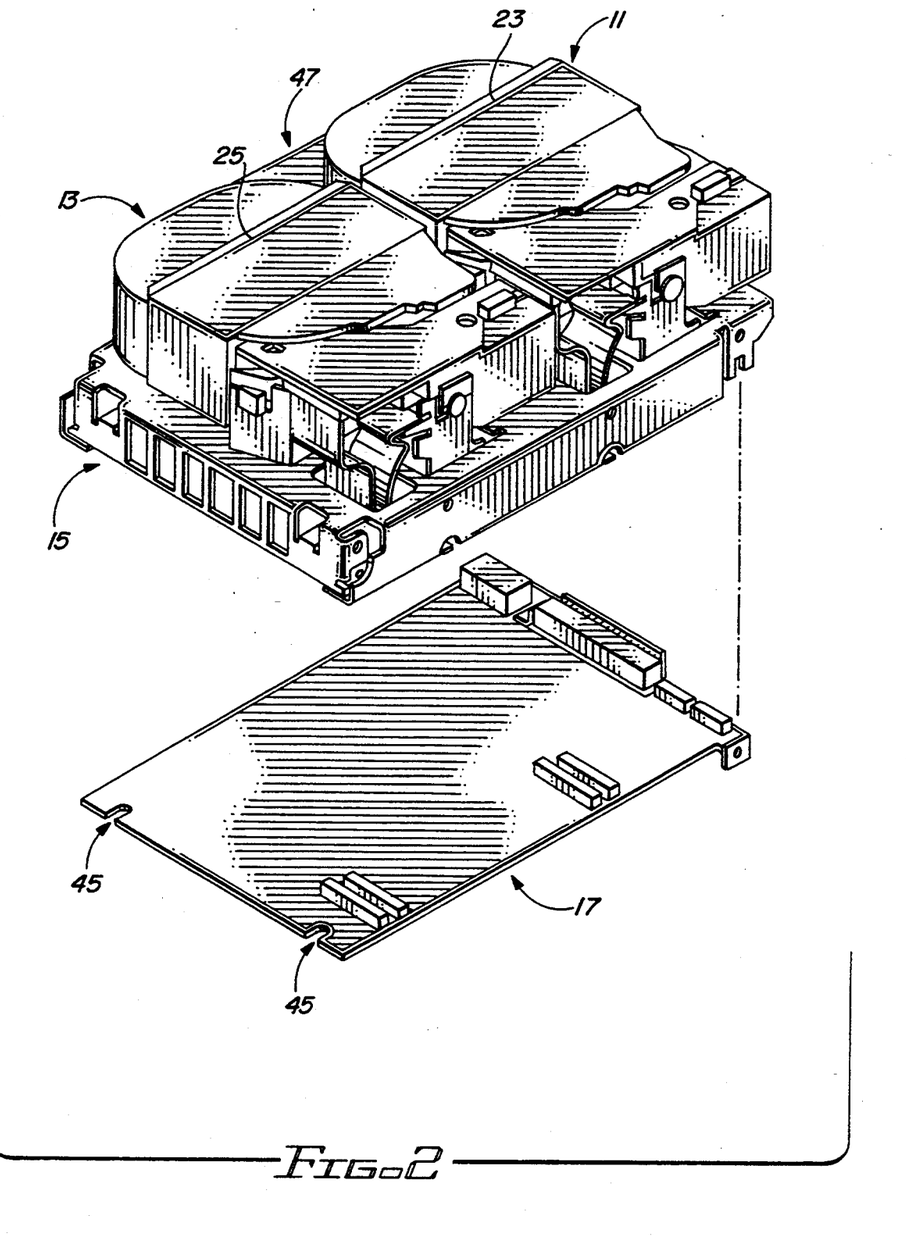
FIG. 2 is a perspective view illustrating the disk drives mounted on the base of the system shown in FIG. 1.

Referring to FIGS. 1 and 2, FIG. 1 is an exploded view of a preferred embodiment of the multiple disk drive system according to the principles of the present invention. The multiple disk drive system 10 comprises two head and disk assemblies (HDA) 11 and 13 mounted on the top side a mounting frame or base 15, a common controller board 17 mounted on the bottom side of the base 15 and including a top cover 19 and a bottom plate 21 attached to the top and bottom of the base 15, respectively, to provide an enclosure for the two HDAs 11 and 13 and the controller board 17. Each of the HDAs 11, 13 is enclosed in a separate housing 23, 25, respectively, which provides a rigid frame for mounting the spindle and attached disks, the spindle motor and the actuator and read/write transducer head assembly as will be described in greater detail below with reference to FIGS. 5 and 6. The base 15 includes a mounting bracket 27 for mounting the HDAs 11 and 13 on the base. The HDAs 11 and 13 are mounted side-by-side on the base 15 and attached to bracket 27, for example, by stud 31 engaging slot 29 and secured by clip 35. Shock absorbing devices, such as rubber shock absorber 33, for example, are provided at the HDAs 11 and 13 attachment points to provide mechanical isolation from the base 15. Similarly, studs 37 and 39 engage slots 41 and 43, respectively; additional stud and clip combinations (not shown) or other suitable attachment means complete the attachment of the HDAs 11, 13 to the bracket 27.

The base 15 also includes a mounting bracket 49 for mounting a vibration damping device 47. The vibration damper 47 is attached to the bracket 49 in such a manner that a force is applied to the front side 51 of each HDA housing 23, 25 when the IHDAs 11 and 13 are mounted on the base 15. The vibration damper device 47 comprises a stainless steel spring providing a controlled force acting on the HDA housings. The stainless steel spring is coated with a low-wear, insulating material, such as XYLAN 1010, to provide electrical insulation and a consistent coefficient of friction between the HDA housings 23, 25 and the vibration damper 47. The vibration damper 47 is rigidly secured to the mounting bracket 49 by bolts and nuts or other well-known manner.

When mounting two or more HDAs on a common frame, base 15, for example, the frame must be sufficiently rigid to minimize effects due to both external vibration and shock and to vibrational forces generated by the HDAs themselves. For example, rotational torque generated by the rotating magnetic disks is transmitted to the HDA housing causing low frequency vibrations. This vibration may also be transmitted to adjacent HDAs via the mounting frame. One result of such vibration is track misregistration greatly increasing the demands on the head tracking servo system. The use of dampening systems, such as the vibration dampening device 47, for example, reduces the rigidity and stiffness requirements of the mounting frame resulting in a lighter, less massive frame and allowing a greater choice of materials for fabrication of the mounting frame. In the preferred embodiment, the vibration damper 47 applies a frictional dampening force in the range of 0.8 kilograms to 2.0 kilograms to the front side 51 of each HDA 11, 13. The frictional force applied by the vibration damper 47 minimizes the low frequency resonance of the individual HDAs 11, 13 and stiffens the HDA shock mounts, shock absorber 33, for example, to minimize transmission of vibration and shock between adjacent HDAs.

The controller board 17 comprises a multi-layer printed circuit board having various electronic components mounted thereon and provides the required electronic circuitry to facilitate operation and control of the HDAs 11 and 13, couple information to and from the HDAs and to interface with a host computer system. The controller board 17 also includes a power connector 53, a controller interface connector 55 and a jumper block or options connector 57 mounted thereon at the rear end of the board. Cables 59 connect the controller board to the HDAs 11 and 13 and to the data channel boards 61 and 63, respectively, mounted on the HDA housings. The controller board 17 is described in greater detail below with reference to FIG. 7.

Figure 3:
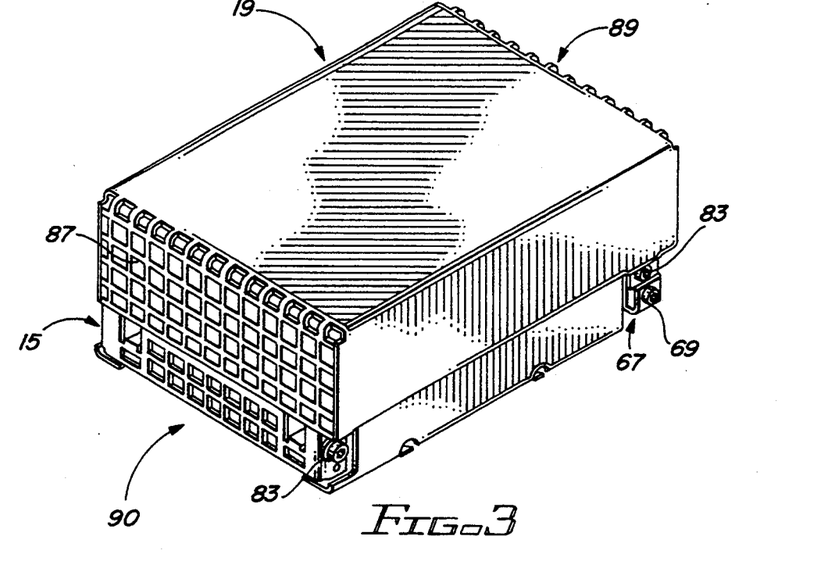
FIG. 3 is a perspective view illustrating the disk drive system of FIG. 1 in assembled form.
Figure 4:
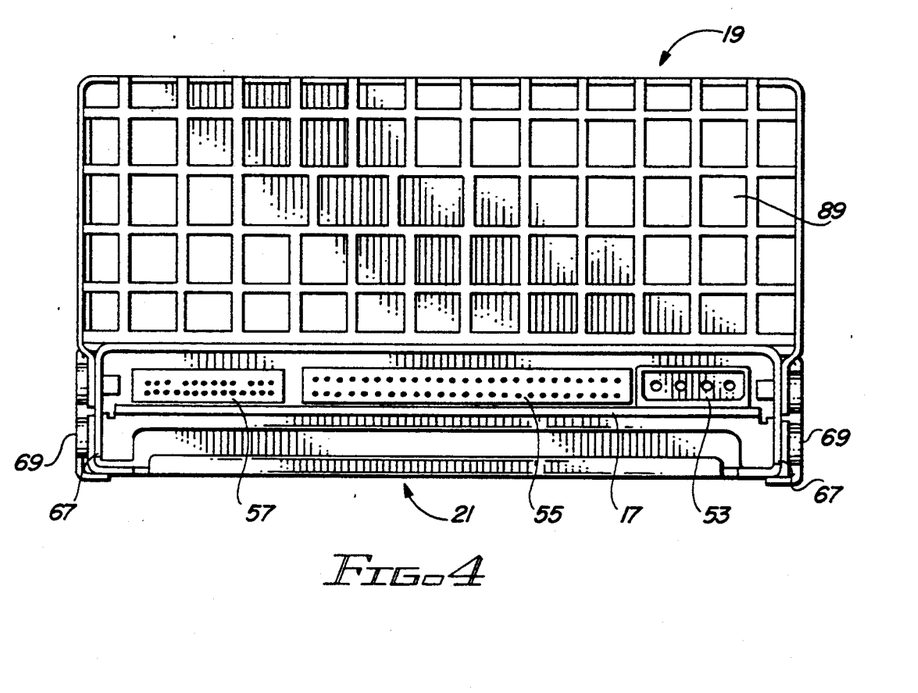
FIG. 4 is a rear view of the disk drive system shown in FIG. 3 illustrating the controller board connectors and the cover cooling vents.

Referring now also to FIGS. 3 and 4, the controller board 17 is mounted on the bottom side of the base 15. Slots 45 in the front edge of the board 17 engage corresponding studs or clips formed in the bottom side of the base 15 (not shown). The board 17 is retained in position by a rear mounting bracket 65 which engages the board at its rear edge and is secured to the base 15 in slots 67 by screws or bolts and nuts 69 through tabs 71. The base 15 includes downwardly extending side and front walls 73 and 75, respectively, which form an enclosure for the controller board 17 when the bottom plate 21 is attached to the base 15. The front wall 75 includes a pattern of air or ventilation holes formed therethrough to provide a cooling air inlet for the controller board components.

The top cover 19 is attached to the base 15 by slots 79 in engagement with screws or bolts and nuts 83 through holes 81. The bottom plate 21 is attached to the bottom side of the base 15 by tabs 85 in engagement with corresponding slots (not shown) in the lower portion of the base front wall 75 and maintained in position by screws or bolts and nuts 69 through slots 77 and 67 at the rear of the base. When completely assembled, the two HDAs 11 and 13 are enclosed in an upper enclosure above the base 15 and the controller board 17 is enclosed in a lower enclosure below the base 15. The front and rear walls 87 and 89, respectively, of the cover 19 have a pattern of air or ventilation holes formed therethrough to allow cooling of the HDAs and associated components. The rear of the lower enclosure is open allowing cooling air to flow through the enclosure and to provide access to the controller board connectors 53, 55 and 57.

The assembled multiple disk drive system, as shown in FIG. 4, forms a complete plug-in disk drive unit 90 having overall dimensions of approximately 3.25 inches (82.5 millimeters (mm)) in height, 5.75 inches (146.0 mm) in width and 8.25 inches (209.5 mm) in length, the approximate dimensions of the industry-standard form factor for a five and one-quarter ($5\frac{1}{4}$) inch disk drive. An industry-standard pattern of mounting holes are provided which allows the disk drive unit 90 to be mounted in six different positions. The controller board connectors 53, 55 and 57 comprise industry-standard components. The disk drive unit 90 is completely interchangeable with other industry-standard $5\frac{1}{4}$ inch form factor disk drives and can be used in any $5\frac{1}{4}$ inch slot or rack in a computer, such as a PC for example.

Figure 5:
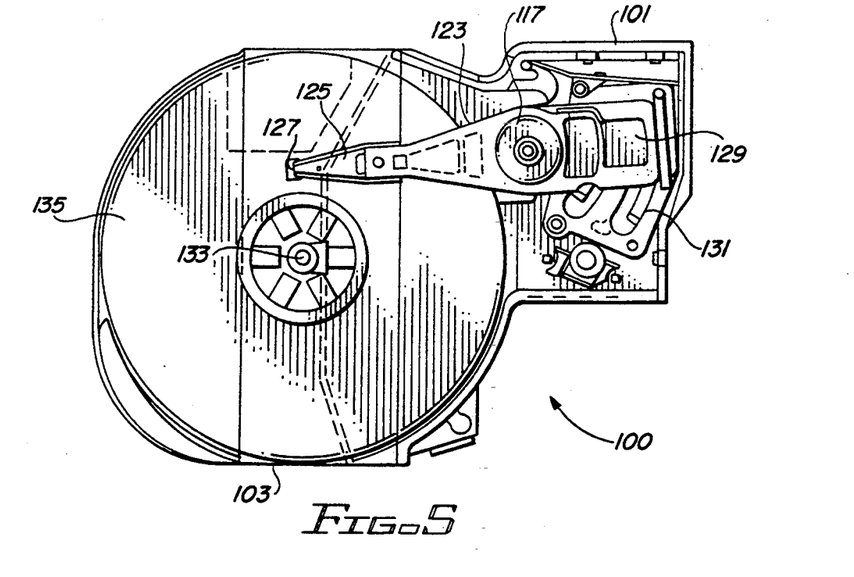
FIG. 5 is a top view illustrating a disk drive suitable for use in the multiple disk drive system shown in FIG. 1.
Figure 6:
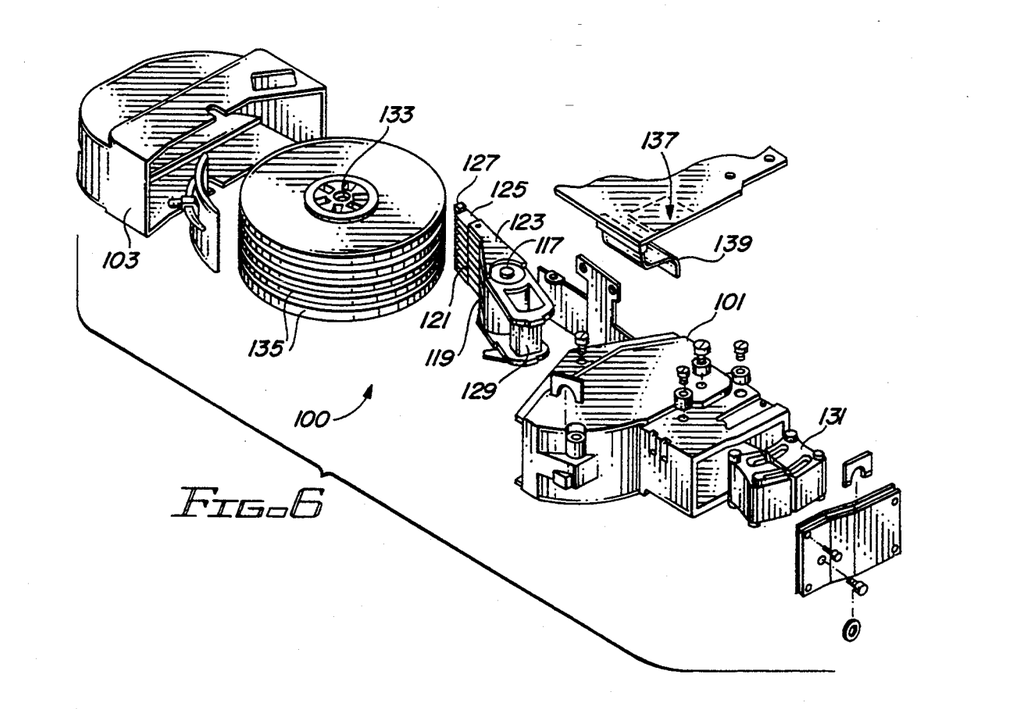
FIG. 6 is an exploded view in perspective of the disk drive shown in FIG. 5.

The HDAs 11 and 13 utilized in the preferred embodiment described above have a length approximately equal to the width of a $5\frac{1}{4}$ inch disk drive form factor and a width approximately equal to one-half the length of a $5\frac{1}{4}$ inch disk drive form factor which are the approximate dimensions of a three and one-half ($3\frac{1}{2}$) inch disk drive form factor. FIGS. 5 and 6 are a top plan view and an exploded view in perspective, respectively, of an HDA for a $3\frac{1}{2}$ inch form factor disk drive which is suitable for use in the multiple disk drive system 10 of the present invention.

Referring now to FIGS. 5 and 6, a disk drive 100 includes a housing 101, and a housing cover 103 which, after assembly, is mounted on base 15 within bracket 27 (as shown in FIG. 1). Rotatably attached within the housing 101 on an actuator shaft 117 is an actuator arm assembly 119. One end of the actuator arm assembly 119 includes an E block or comb like structure 121 having a plurality of arms 123. Attached to the separate arms 123 on the comb or E block 121 are load springs 125. Attached at the end of each load spring is a slider 127 which carries a magnetic transducer head (not shown). On the other end of the actuator arm assembly 119 opposite the load springs 125 and the sliders 127 is a voice coil 129.

Attached within the housing 101 is a pair of magnets 131. The pair of magnets 131 and the voice coil 129 are key components of a voice coil motor which applies a force to the actuator assembly 119 to rotate it about the actuator shaft 117. Also mounted within the housing 101 is a spindle shaft 133. Attached to the spindle shaft 133 are a number of magnetic storage disks 135. A spindle motor (not shown in FIG. 6) is coupled to the spindle shaft 133 for rotatory motion of the spindle shaft at a selected speed. As shown in FIG. 6, eight disks 135 are attached to the spindle shaft 133 in spaced apart relation. When assembled, the separate arms 123 extend between the disks 135 in such a manner that the magnetic head at the end of each load spring 125 is closely adjacent a surface of one of the disks. During storing and retrieving (write/read) of information, the voice coil motor responsive to control signals causes the magnetic head to be moved across the surface of the disk.

Figure 7:
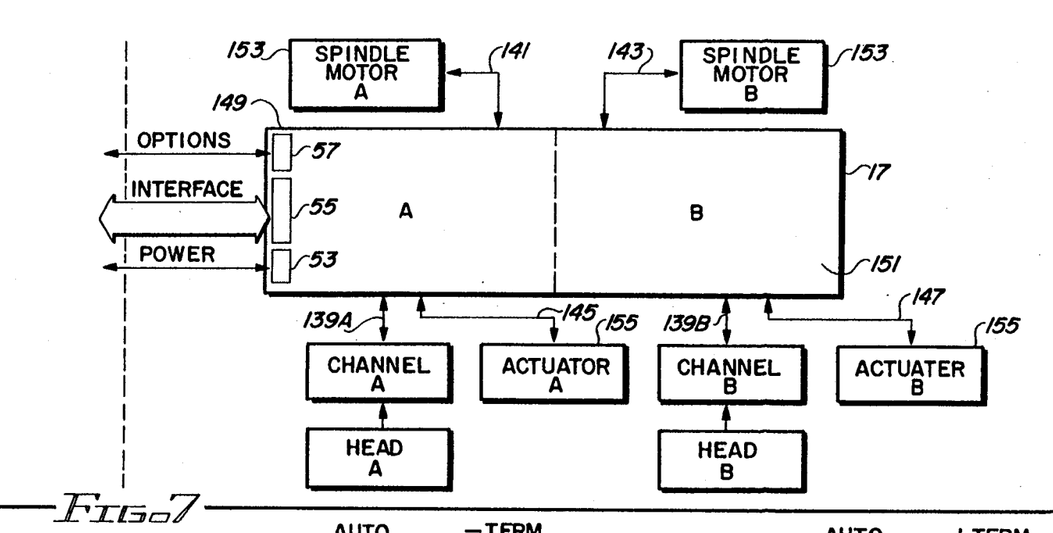
FIG. 7 is a conceptual block diagram of the electrical, control and communications distribution circuitry for the disk drive system shown in FIG. 1.

Referring now also to FIG. 7, the single electronics controller board or card 17 is mounted in the lower enclosure below the two HDAs 11 and 13 (as shown in FIG. 1) and is shared by the two HDAs. For the purposes of the description of the controller board 17, the two HDAs 11 and 13 will be referred to as drive A and drive B, respectively. Each drive A, B is electronically controlled by an interface microprocessor, a servo control microprocessor, several logic modules, digital-/analog converters and various drivers and receivers and associated circuitry. With the exception of the data channel circuitry which is mounted on a separate channel board 137 (as shown in FIG. 6) for each drive A, B, all of the control circuitry and components are mounted on the controller board 17. While some of the components physically may be shared by the two drives A, B for efficiency and parts reduction, logically, the controller board 17 is divided into halves, one-half A, 149, providing control for drive A and the other half B, 151, provide control for drive B.

Since the control electronics for both of the drives is essentially identical, both in operation and composition, the operation of only one will be described.

The servo microprocessor (not shown) for each drive A, B generates all actuator servo and spindle motor control signals with tile exception of starting and stopping of the spindle. The servo microprocessor controls the spindle motor speed via a closed loop servo system and performs the spindle synchronization function. The servo microprocessor provides spindle motor control signals for its respective drive on lines 141 and 143, respectively. The spindle is driven directly by an in-hub, brushless DC drive motor 153 receiving its power from the controller board. Dynamic braking us utilized to quickly stop the spindle upon receipt of a stop signal.

The actuator 155 is a swing-arm assembly driven by a voice coil motor having the read/write transducer heads mounted opposite the voice coil motor. The servo microprocessor initially conducts a power-up sequence and calibrates the actuator servo system. All actuator control signals providing closed loop control of transducer head positioning and tracking on the disk surface are generated by the servo microprocessor. A dedicated servo disk surface and head provides feedback to the actuator servo to maintain the read/write heads centered over the desired track on the disk. The servo microprocessor monitors the actuator position and determines a target track for a seek operation. Utilizing stored velocity profiles, the voice coil motor power amplifier driver is controlled to drive the actuator to a desired target track. During seek operations, the dedicated servo head provides track crossing information to the servo. Responsive to appropriate input conditions, the servo microprocessor generates control signals for accessing servo signal gating, recalibration, track following and error detection and recovery. The servo microprocessor provides servo control signals to its respective actuator servo via lines 145 and 147, respectively.

The interface microprocessor (not shown) controls and interprets all interface signals between the host computer system controller and its respective drive. The interface microprocessor generates the spindle start and stop signals for its respective drive. All data processing circuitry and logic including coding for write and detection and decoding operations, error detection and error correction is implemented on a separate data channel board 137 (as shown in FIG. 6) for each drive A, B coupled to its microprocessor via lines 139A and 139B, respectively. The interface microprocessor controls the transfer of data between its respective drive A, B and the lost computer system, read/write access of the disk media and disk defect management and error recovery. Additionally, the interface microprocessor performs diagnostics and provides monitoring of the spindle status.

The multiple disk drive unit 90 is coupled to the host computer system via the connectors 53, 55 and 57 mounted at the rear edge of the controller board 17. The controller board may use ANSI standardized SCSI or IPI interfaces in either differential or single-ended versions. In the preferred embodiment, single-ended buffered SCSI is utilized and the interface signal connector 55 comprises a 50-pin connector meeting ANSI/SCSI specifications (Molex part no. 70246 is suitable for this purpose). The pin assignments are given in Table I. The DC power connector 53 comprises a 4-pin connector which couples +12 volt and +5 volt power to the board 17 and provides two system grounds.

TABLE I

| Signal Name | Conductor Pin Number | | Signal Name |
|---|---|---|---|
| GROUND | 1 | 2 | -DB(0) |
| GROUND | 3 | 4 | -DB(1) |
| GROUND | 5 | 6 | -DB(2) |
| GROUND | 7 | 8 | -DB(3) |
| GROUND | 9 | 10 | -DB(4) |
| GROUND | 11 | 12 | -DB(5) |
| GROUND | 13 | 14 | -DB(6) |
| GROUND | 15 | 16 | -DB(7) |
| GROUND | 17 | 18 | -DB(P) |
| GROUND | 19 | 20 | GROUND |
| GROUND | 21 | 22 | GROUND |
| OPEN | 23 | 24 | OPEN |
| OPEN | 25 | 26 | TERMPWR |
| OPEN | 27 | 28 | OPEN |
| GROUND | 29 | 30 | GROUND |
| GROUND | 31 | 32 | -ATN |
| GROUND | 33 | 34 | GROUND |
| GROUND | 35 | 36 | -BSY |
| GROUND | 37 | 38 | -ACK |
| GROUND | 39 | 40 | -RST |
| GROUND | 41 | 42 | -MSG |
| GROUND | 43 | 44 | -SEL |
| GROUND | 45 | 46 | -C/D |
| GROUND | 47 | 48 | -REQ |
| GROUND | 49 | 50 | -I/O |

Figure 8:
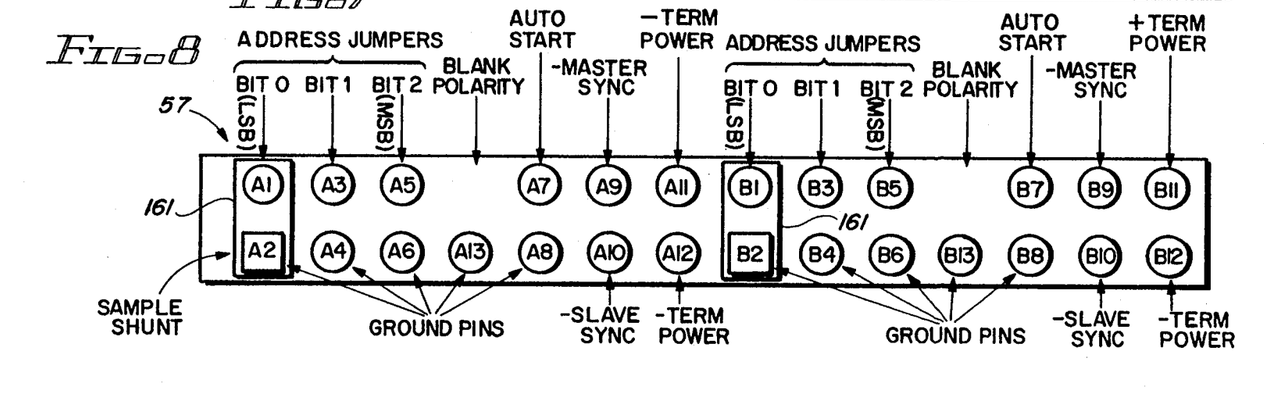
FIG. 8 is a plan view of the jumper block for the controller board shown in FIG. 7.

The options block 57 comprises a 26-pin jumper block 57 as shown in FIG. 8. Pins A1–A6 and B1–B6 are used to select and set the respective drive A, B SCSI device address (SCSI ID). The desired address is set utilizing a jumper or shorting block 161, shunting one or more of the bit pins to ground. Pin configuration for a desired drive address is defined in Table I. Pins A9, A10 and B9, B10 control spindle synchronization and the remaining pins control spindle motor start and term power for the respective A and B drives.

TABLE II

| ADDRESS DETERMINATION | | | |
|---|---|---|---|
| BIT0 | BIT1 | BIT2 | ADDRESS |
| off | off | off | 0 |
| on | off | off | 1 |
| off | on | off | 2 |
| on | on | off | 3 |
| off | off | on | 4 |
| on | off | on | 5 |
| off | on | on | 6 |
| on | on | on | 7 |

Note:
In the chart above "off" means jumper is not in place and "on" means jumper is in place.

The multiple disk drive unit 90 provides a two-drive array utilizing a common controller board and a common interface connector in a 5¼ disk drive form factor. The two-drive array may be controlled in various configurations to provide optimum performance or user desired features. The configuration of the preferred embodiment comprises two separately addressable independent disk drives accessed through a common SCSI connector. The address (SCSI ID) of each drive A, B is set at the jumper block 57 as described above. A user then may use one drive, drive A, for example, while reserving the other drive as a "hot" spare. Alternatively, both drive A and drive B may be used for continuous data storage thus providing greater storage capacity than provided by a single 5¼ inch drive while reducing the power and cooling requirements and the cables, connectors, etc., required for two 3½ inch drives.

Figure 9:
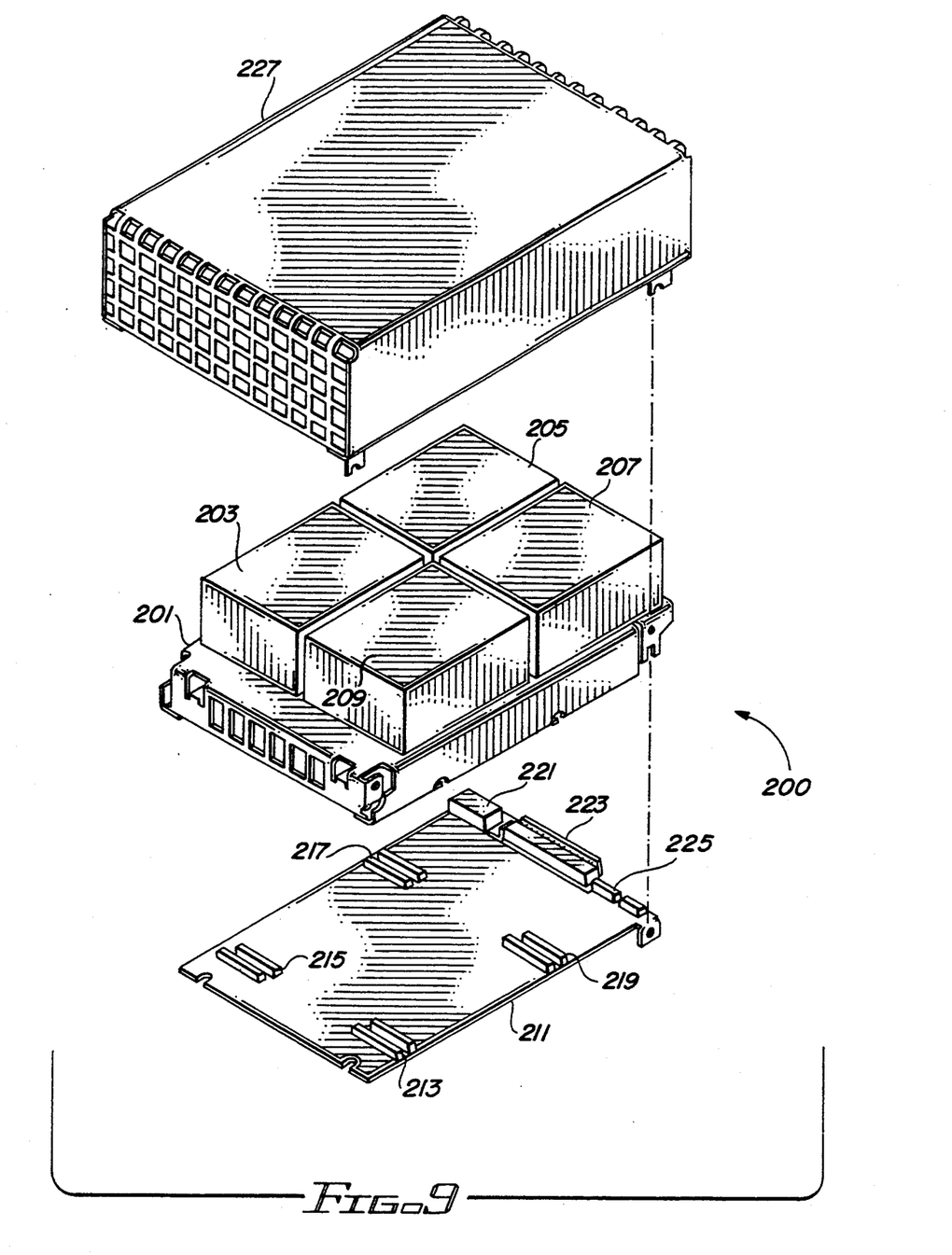
FIG. 9 is a partially exploded view in perspective of a second embodiment of the multiple disk drive system of the present invention.

Referring now to FIG. 9, a second preferred embodiment of a multiple disk drive system according to the principles of the present invention is shown. A multiple disk drive system 200 comprises a base 201 having four HDAs 203, 205, 207 and 209 mounted on an upper side thereof and a single controller board 211 providing the circuitry and components required for the operation and control of the four HDAs. Cable connector pairs 213, 215, 217 and 219 are provided to couple power and control signals to and transfer data to and from the HDAs 209, 203, 205 and 207, respectively. Power connector 221 and interface connector 223 are mounted at the rear edge of the controller board 211 to couple the multiple disk drive system 200 to a host computer system. As described above with reference to FIG. 1, the controller board 211 is mounted on tile bottom side of the base 201 beneath the HDAs. Similarly, a top cover 227 and a bottom cover (as shown in FIG. 1) are attached to the base 201 forming upper and lower enclosures which enclose the four HDAs and the controller board, respectively. When assembled, a complete disk drive unit 90 is formed (as shown in FIG. 4) which provides an array of four separately addressable, independent disk drives accessible via a common interface connector.

In the preferred embodiment as described above with reference to FIG. 9, the disk drive unit 90 has approximately the overall dimensions of a 5¼ inch disk drive form factor (as shown in FIG. 4). Each of the four HDAs 203, 205, 207 and 209 mounted on base 201 has a length approximately equal to one-half the length of a 5¼ inch drive form factor and a width approximately equal to one-half the width of a 5¼ inch disk drive form factor, which length and width approximate the dimensions of a two and one-half (2½) inch disk drive form factor.

While the invention has been particularly shown and described with reference to various preferred embodiments thereof, it is understood by those skilled in the art that the invention is not to be limited to the disclosed embodiments, but that various modifications in the form and details may be made therein without departing from the spirit and scope of the appended claims.

We claim:

1. A multiple disk drive system comprising:
a base;
a number N of disk drives for storing information, said N disk drives mounted on a top side of said base;
a single vibration damper member mounted on said base for coupling a force to each of said disk drives for minimizing the effects of shock and vibration on the operation of said N disk drives, said vibration damper member being coated with a layer of electrically insulating material insulating said vibration damper member from said N disk drives;
control means coupled to said N disk drives for providing control signals; and
data means for coupling information to and from said N disk drives in response to said control signals.

2. A multiple disk drive system as in claim 1 further comprising a common controller board mounted on a bottom side of said base underlying said N disk drives, said controller means and said data means mounted thereon.

3. A multiple disk drive system as in claim 2 wherein said vibration damper means comprises spring means for applying a frictional force to each of said N disk drives.

4. A multiple disk drive system as in claim 3 wherein said electrically insulating material provides a selected coefficient of friction between said spring means and each said disk drive.

5. A multiple disk drive system as in claim 3 wherein said spring means comprises a single-piece stainless steel spring member mounted to said steel base.

6. A multiple disk drive system comprising:
a base;
a number of N of disk drives for storing information, said N disk drives mounted on a top side of said base; and
a single vibration damper member mounted on said base for coupling a force to each of said disk drives for minimizing the effects of shock and vibration on the operation of said N disk drives, said vibration damper member being coated with a layer of electrically insulating material insulating said vibration damper member from said N disk drives.

7. A multiple disk drive system as in claim 6 wherein said vibration damper means comprises spring means for applying a frictional force to each of said N disk drives.

8. A multiple disk drive system as in claim 7 wherein said electrically insulating material provides a selected coefficient of friction between said spring means and each said disk drive.

9. A multiple disk drive system as in claim 7 wherein said spring means comprises a single-piece stainless steel spring member mounted to said base.

10. A multiple disk drive system comprising:
a base;
two disk drives mounted on a top side of said base, each of said disk drives enclosed in a separate housing for mounting to said base;
a single-piece spring member mounted on said base and contacting each said separate housing at a selected point for coupling a frictional force to each of said two disk drives at said selected point of contact, said spring member for minimizing the effects of shock and vibration on the operation of said two disk drives;
said spring member being coated with a layer of low-wear, electrically insulating material for electrically insulating said spring member from said two disk drives and for providing a selected coefficient of friction between said spring member and each said disk drive at said point of contact;
control means coupled to said two disk drives for providing control signals; and
data means for coupling information to and from said two disk drives in response to said control signals.

11. A multiple disk drive system as in claim 10 wherein said spring member is of stainless steel.

12. A multiple disk drive system comprising:
a base
two disk drives for storing information mounted on a top side of said base, each of said two disk drives enclosed in a separate housing;
a single-piece spring member mounted on said base and contacting each said separate housing at a selected point for coupling a frictional force to each of said two disk drives at said selected point of contact, said spring member for minimizing the effects of shock and vibration on the operation of said two disk drives; and said spring member being coated with a layer of low-wear, electrically insulating material for electrically insulating said spring member from said two disk drive and for providing a selected coefficient of friction between said spring member and each said disk drive at said point of contact.

13. A multiple disk drive system as in claim 12 wherein said spring member is of stainless steel.

* * * * *